US007889364B2

(12) United States Patent
Sakabe

(10) Patent No.: US 7,889,364 B2
(45) Date of Patent: Feb. 15, 2011

(54) IMAGE FORMING APPARATUS HAVING A CONVENIENT SHEET INSERTION FUNCTION

(75) Inventor: Tomokazu Sakabe, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1084 days.

(21) Appl. No.: 11/616,459

(22) Filed: Dec. 27, 2006

(65) Prior Publication Data

US 2008/0159771 A1 Jul. 3, 2008

(51) Int. Cl.
*G06F 3/12* (2006.01)
*G06K 15/00* (2006.01)

(52) U.S. Cl. ...................................... 358/1.13; 358/1.1

(58) Field of Classification Search ................. 358/1.1, 358/1.9, 1.11, 1.13, 1.14, 1.15, 1.18, 474, 358/400, 448; 399/81, 82, 84, 85
See application file for complete search history.

(56) References Cited

U.S. PATENT DOCUMENTS 5,794,099 A * 8/1998 Sheldon et al. ............... 399/82
7,456,981 B2 * 11/2008 Kuboki ...................... 358/1.13

FOREIGN PATENT DOCUMENTS

JP 2002-204323 7/2002

* cited by examiner

*Primary Examiner*—Gabriel I Garcia
(74) *Attorney, Agent, or Firm*—Turocy & Watson, LLP

(57) ABSTRACT

An image forming apparatus includes a scanner unit to read an original document, an image data storage unit to store read image data, a print unit to print out the image data, a sheet insertion designation unit to perform a sheet insertion processing and a sheet insertion control unit. The user performs execution designation of the sheet insertion processing by the sheet insertion designation unit before a reading job of a first original document. When the execution of the sheet insertion processing is designated and a reading job of a specified original document is ended, the sheet insertion control unit requests the user to select a mode of the sheet insertion processing, and creates page data for performing the sheet insertion in the mode designated there. The printout including the page data for the sheet insertion is performed collectively after reading jobs of all original documents are ended.

17 Claims, 4 Drawing Sheets

IMAGE FORMING APPARATUS HAVING A CONVENIENT SHEET INSERTION FUNCTION

BACKGROUND OF THE INVENTION

1. Field of the Invention

The present invention relates to an image forming apparatus, such as a copying machine, a printer or a multifunction peripheral with functions of these, having a function to perform sheet insertion at a specified position when paper printing is performed.

2. Description of the Related Art

Some multifunction peripheral (MFP) as an example of an image forming apparatus have a so-called sheet insertion function in order to cause a finally obtained print to be easily viewed.

As a specific example of the sheet insertion function used in a case where a copy of original documents including plural sheets is created, there is a function to insert, for example, a sheet having a different color, or a sheet having a different thickness or a white sheet (hereinafter referred to as "insertion sheet") between pages desired by a user. In the case where the sheet insertion processing as stated above is performed, the user designates a paper feed tray of the insertion sheet and designates an insertion position of the insertion sheet by use of a paper number, and then, a copy job is started.

However, in the designating method of the sheet insertion condition as stated above, unless the user accurately grasps the page numbers of the original documents, the insertion position of the insertion sheet can not be designated. Especially, in the case where original documents including many pages are handled or in the case where the insertion number of the insertion sheets is large, it takes much time and labor for the user to accurately input the page number, and therefore, the working efficiency is poor. Besides, in the case where printing is performed on the insertion sheet, the sheet insertion condition becomes complicated, and the working load of the user is further increased.

Besides, for example, JP2002-204323 discloses a sheet insertion method in which plural original documents are sequentially read, and when the read images are printed out collectively, a specified sheet is automatically inserted between copies of the respective original documents.

However, in the image forming apparatus of JP2002-204323, in the case where the insertion sheet is desired to be changed, setting not to perform the sheet insertion at a desired position can not be performed and this is inconvenient.

SUMMARY OF THE INVENTION

It is an object of the present invention to provide an image forming apparatus having a convenient sheet insertion function.

An image forming apparatus according to a first aspect of the invention includes a scanner unit configured to read an original document, an image data storage unit configured to store image data read by the scanner unit, a print unit configured to print out the image data stored in the image data storage unit, a sheet insertion designation unit and a sheet insertion control unit configured to perform a sheet insertion processing. The user performs execution designation of the sheet insertion processing by the sheet insertion designation unit before a reading job of a first original document. When the execution of the sheet insertion processing is designated and a reading job of a specified original document is executed, the sheet insertion control unit requests the user to select a mode of the sheet insertion processing, and page data for performing the sheet insertion in the mode designated there is created. The printout including the page data for the sheet insertion is performed collectively after the reading jobs of all original documents are ended.

An image forming apparatus according to a second aspect of the invention includes a scanner unit configured to read an original document, an image data storage unit configured to store image data read by the scanner unit, a print unit configured to print out the image data stored in the image data storage unit, a job build designation unit and a job build control unit configured to execute a job build processing, and a sheet insertion control unit configured to control a sheet insertion processing. The execution designation of the job build processing is performed by the job build designation unit before a reading job of a first original document. In the case where the execution of the job build processing is designated, the sheet insertion control unit requests the user to select a mode of the sheet insertion processing to insert a specified insertion sheet between prints corresponding to reading jobs of plural original documents at a time period separating the reading jobs of the respective original documents, and creates page data for performing the sheet insertion in the mode designated there. The printout including the page data created in the sheet insertion processing is performed collectively after the reading jobs of all original documents are ended.

An image forming apparatus according to a third aspect of the invention includes reading means for reading an original document, image data storage means for storing image data read by the reading means, print means for printing out the image data stored in the image data storage means, sheet insertion designation means and sheet insertion control means for executing a sheet insertion processing, job build designation means and job build control means for designating execution of a job build processing. The user performs the execution designation of the job build processing and the sheet insertion processing respectively by the job build designation means and the sheet insertion designation means before a reading job of a first original document. In the case where the execution of the job build processing or the execution of the sheet insertion processing is designated, the sheet insertion control means requests the user to select a mode of the sheet insertion processing after end of a reading job of a specified original document, and creates page data for performing the sheet insertion in the mode designated there. After the reading jobs of all original documents are ended, the image data stored in the image data storage means and the created page data are collectively printed out.

The user sets the original document on the scanner unit till a position where the sheet insertion is desired to be performed, so that it is physically recognized where the sheet insertion is performed, and the state of completion can be imaged. By this, the occurrence of a job miss can be suppressed. Besides, the sheet insertion between the reading jobs at the time of the job build execution is also easy. Since the sheet insertion processing is not the conventional automatic insertion between the reading jobs, but can be selected by the user, in the case where the sheet insertion is not desired to be performed, such selection can also be performed.

DETAILED DESCRIPTION OF PREFERRED EMBODIMENTS

Hereinafter, embodiments of the invention will be described with reference to the drawings.

Figure 1:
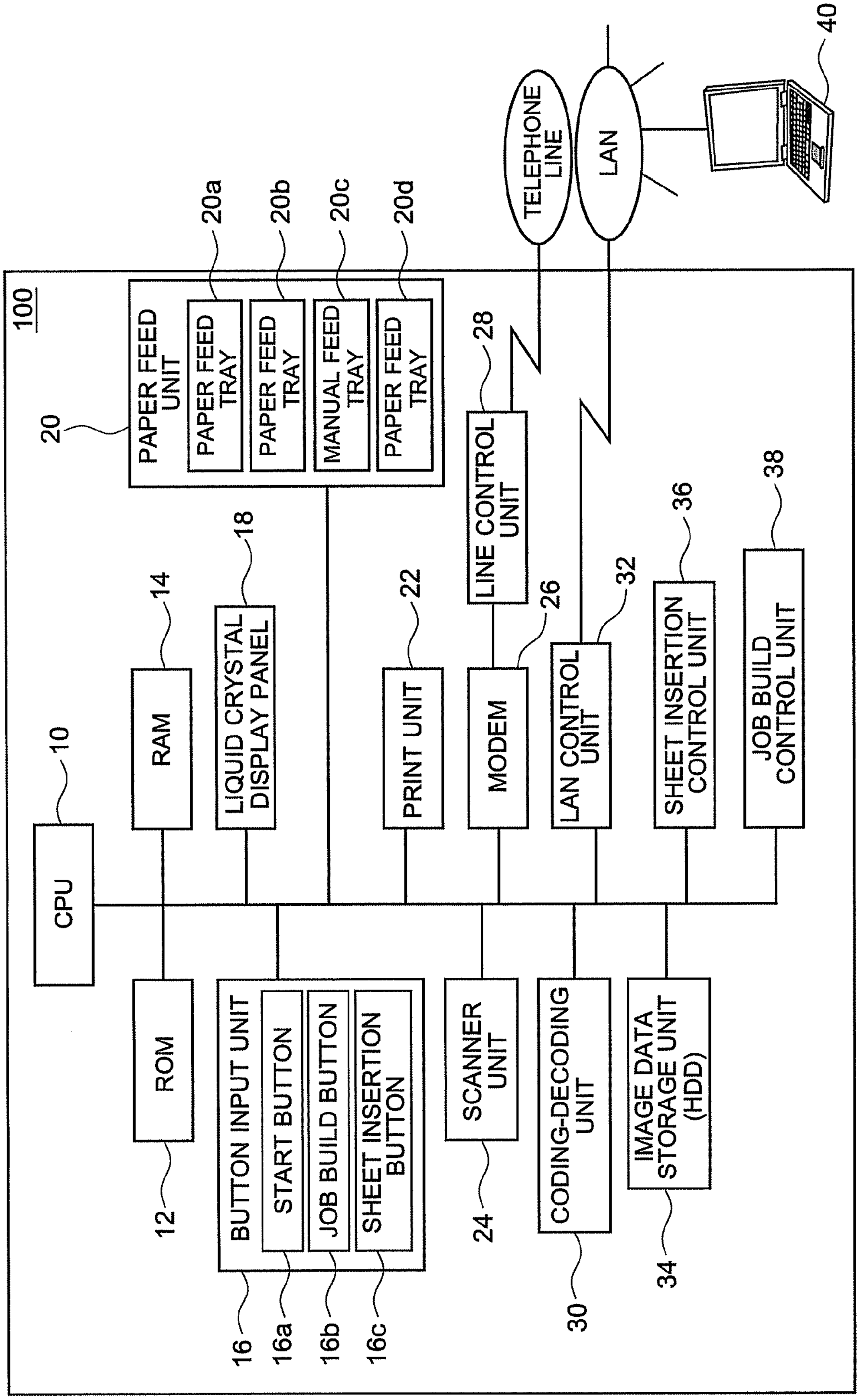
FIG. 1 is a view showing a system structure of an image forming apparatus according to an embodiment of the invention.

FIG. 1 shows a system structure of an image forming apparatus according to an embodiment of the invention. This image forming apparatus 100 is a multifunction peripheral (MFP) and has functions of a copier, a printer, a scanner and a facsimile.

The image forming apparatus 100 includes a central processing unit (CPU) 10 to perform the operation control and data processing of the image forming apparatus 100, a ROM 12 in which program data for the operation control and for the data processing of the image forming apparatus 100 is stored, a RAM 14 for temporarily storing control information and the like at the time of operation of the image forming apparatus 100, a button input unit 16 having various buttons for operating the image forming apparatus 100, and a liquid crystal display panel 18 to display operation information according to the operation of the button input unit 16 and job information under progress. Incidentally, the liquid crystal display panel 18 has a touch panel function. Besides, the liquid crystal display panel 18 can be replaced by another display device having an equivalent function.

The image forming apparatus 100 includes a scanner unit 24 to read a copy original document or a transmission original document, a print unit 22 to print a copy original document or reception data onto a sheet, a paper feed unit 20 to supply a print sheet and an after-mentioned insertion sheet to the print unit 22, a coding-decoding unit 30 to convert image data into coded data at the time of facsimile transmission and to decode received coded data into image data, a line control unit 28 to control a telephone line for facsimile communication, a modem 26 to modulate the coded data from the coding-decoding unit 30 to output it to the line control unit 28 and to demodulate a modulated signal received by the line control unit 28, a LAN control unit 32 to receive print data transmitted from a personal computer (PC) 40 LAN-connected to the image forming apparatus 100, and an image data storage unit 34 to store image data handled by the image forming apparatus 100.

The scanner unit 24 includes an original document stand and an ADF to automatically read original documents one by one. A hard disk drive (HDD) is preferable as the image data storage unit 34. Hereinafter, it is assumed that the image data storage unit 34 is the HDD and is denoted by "HDD 34".

The button input unit 16 includes a start button 16*a* to start a job such as a copy job, a job build button 16*b* to designate execution of a job build processing to connect reading jobs of plural original documents into one reading job, and a sheet insertion button 16*c* to designate execution of a sheet insertion processing to insert a specified insertion sheet to the back of a print corresponding to a reading job of an original document. In addition, the button input unit 16 includes a stop button to stop a job.

The image forming apparatus 100 includes a job build control unit 38 to control and execute a job build processing in a case where the job build button 16*b* is depressed, and a sheet insertion control unit 36 to control and execute a sheet insertion processing in a case where the sheet insertion button 16*c* is depressed.

The job build control unit 38 includes a storage device, such as a ROM, to store a program for executing the job build processing in an after-mentioned flow, a CPU to execute the program, and a RAM to store control information. The sheet insertion control unit 36 includes a storage device, such as a ROM, to store a program for executing the sheet insertion processing in the after-mentioned flow, a CPU to execute the program, and a RAM to store control information.

The paper feed unit 20 includes a first paper feed tray 20*a*, a second paper feed tray 20*b*, a third paper feed tray 20*d*, and a manual feed tray 20*c*. The first and the second paper feed trays 20*a* and 20*b* can be used for arranging sheets (insertion sheets) for the sheet insertion, such as sheets different from each other in color, or sheets different from each other in thickness. The manual feed tray 20*c* can also be used as a paper feed tray of insertion sheets. The third paper feed tray 20*d* can be used for accommodating print sheets used for printing jobs of original documents. The number of paper feed trays for arranging the insertion sheets may be one or may be three or more.

Next, the job build processing and the sheet insertion processing executed in the image forming apparatus 100 will be described.

In the case where the job build processing is performed, the user performs the depression of the job build button 16*b* as the execution designation of the job build processing before reading of the first original document. In the case where the execution of the job build processing is designated, the job build control unit 38 causes a screen shown in FIG. 2 to be displayed on the liquid crystal display panel 18 after the end of reading of a certain original document. The user can change a reading condition of a next original document by operating this screen. Items which can be changed here include, for example, a change of reading density, a change of a reduction and enlargement ratio of an image, a change of a paper feed tray and the like.

Besides, on this screen, a message of "Please depress the start button after change of setting content" is displayed. Of course, the user can also depress the start button 16*a* without changing the setting content. When the user depresses the start button 16*a* in accordance with this instruction, a sheet insertion mode selection screen is displayed irrespective of whether or not the user has depressed the sheet insertion button 16*c* before the reading of the first original document. The sheet insertion mode selection screen will be described later in detail with reference to FIG. 3.

Figure 2:
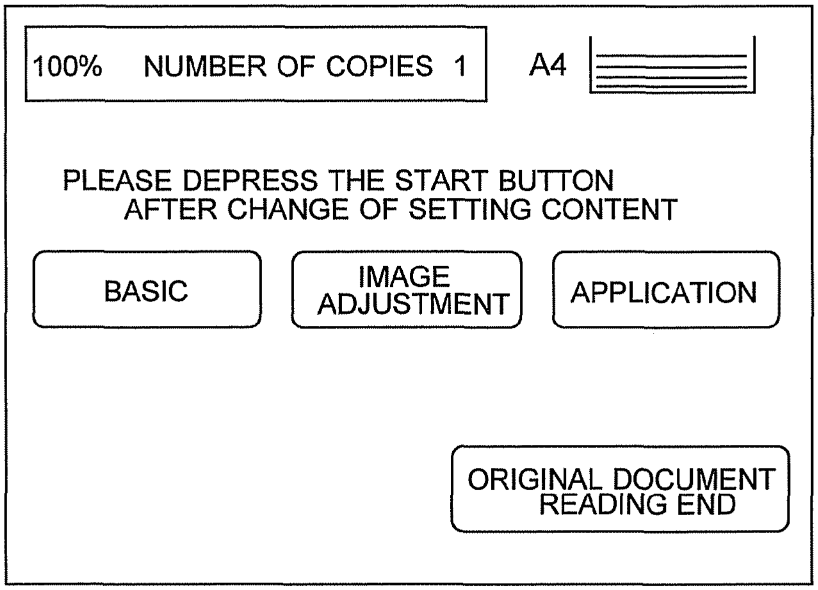
FIG. 2 is a view showing an example of a screen displayed on a liquid crystal display panel for changing job build condition.

An icon of "original document reading end" is displayed on the screen of FIG. 2. In the case where there is no original document to be read next, the user depresses this icon. By this, the image data of the original documents read till that time are printed out collectively.

Incidentally, in the state where the screen of FIG. 2 is displayed, when the user depresses the stop button provided in the button input unit 16, the job build processing is released. When the job build is released, it is regarded that the job is cancelled. Accordingly, the image data of the previously read original documents are not printed out.

In the case where the sheet insertion processing is performed, it is necessary for the user to depress the sheet insertion button 16*c* before the reading job of the first original document. In the case where the sheet insertion processing is selected, the sheet insertion control unit 36 causes the screen shown in FIG. 3 to be displayed on the liquid crystal display panel 18 after the end of reading of a certain original document. The user operates this screen and can select a desired sheet insertion mode.

Figure 3:
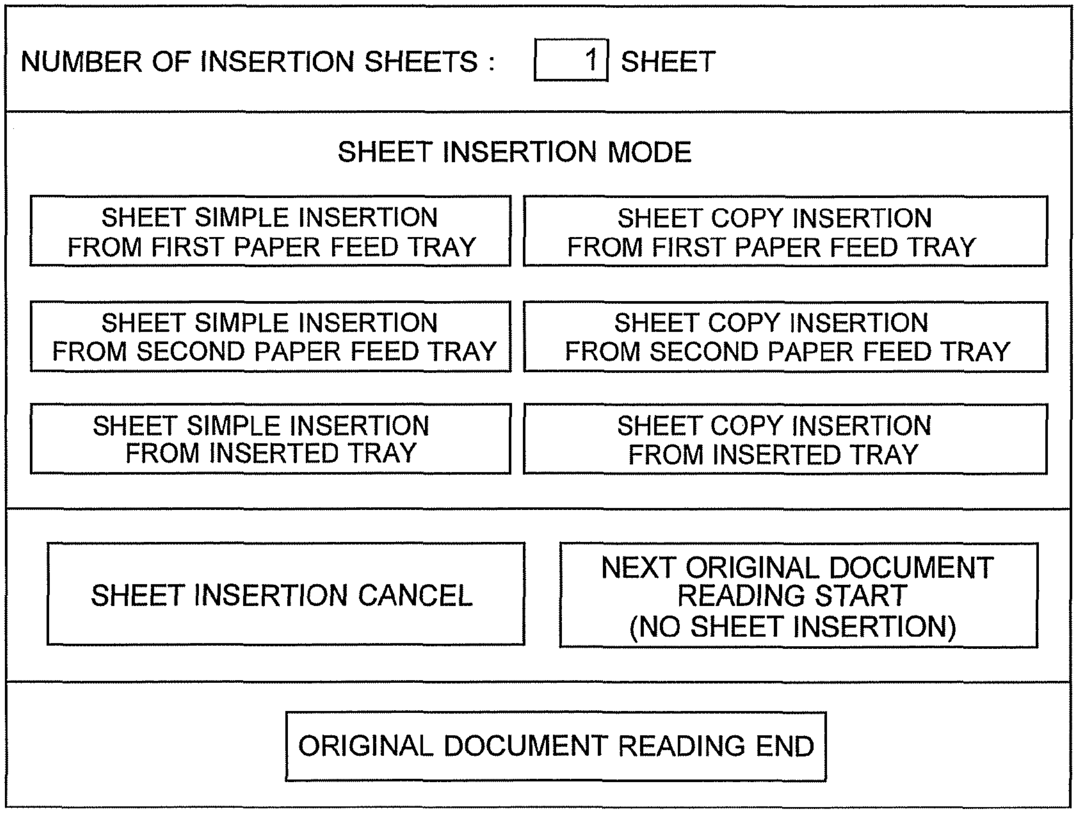
FIG. 3 is a view showing an example of a screen displayed on the liquid crystal display panel for a sheet insertion mode selection.

Incidentally, in the case where the job build processing is also simultaneously selected, when the user depresses the start button 16*a* in the state where the job build condition change screen of FIG. 2 is displayed on the liquid crystal display panel 18, the screen shown in FIG. 3 is displayed on the liquid crystal display panel 18.

The mode of the sheet insertion processing is roughly divided into a mode ("sheet copy insertion" shown in FIG. 3) in which printing is performed on an insertion sheet and a mode ("sheet simple insertion" shown in FIG. 3) in which printing is not performed on an insertion sheet. The sheet insertion processing includes a processing to insert an insertion sheet between two original documents, and a processing to insert an insertion sheet to the last of the original documents as the spine. In the latter case, there can be a case where the number of original documents is one.

As shown in FIG. 3, in the case where the sheet insertion processing is performed, the paper feed tray and the existence of printing on the insertion sheet can be simultaneously designated. Besides, the number of the insertion sheets can also be designated. Further, as described later, plural sheet insertion processings can also be continuously performed in different sheet insertion modes. Incidentally, icons may be structured so that the paper feed tray and the existence of printing on the insertion sheet can be separately designated.

In the case where the user designates the mode in which printing is performed on the insertion sheet, the sheet insertion control unit 36 changes the display of the liquid crystal display panel 18 to, for example, a message screen of "Please set a sheet original document and depress the start button". In response to this, the user sets the original document, which has an image to be printed on the insertion sheet, on the scanner unit 24, and depresses the start button 16*a*. In this way, reading of this original document is performed, and page data for sheet copy insertion is created. Thereafter, the display of the liquid crystal display panel 18 is returned to the screen of FIG. 3.

In the case where the user designates the mode in which printing is not performed on the insertion sheet, the sheet insertion control unit 36 creates page data for sheet simple insertion so that the designated sheet is inserted after a print corresponding to a previously read original document. It is also preferable that a screen on which the user can confirm that the sheet simple insertion has been received is displayed on the liquid crystal display panel 18. For example, a message of "Sheet simple insertion page data is created" and an icon of "return to the original screen" are displayed on the liquid crystal display panel 18.

After the page data for sheet insertion processing is created as described above, an icon of "sheet insertion cancel" shown in FIG. 3 is used to delete the page data. In the case where the icon of "sheet insertion cancel" is depressed, the sheet insertion processing in the mode performed just before becomes ineffective.

After performing a desired sheet insertion processing, the user sets a next original document on the scanner unit 24. When the user depresses an icon of "next original document reading start (no sheet insertion)" shown in FIG. 3, the original document reading in the scanner unit 24 is started. Incidentally, in the case where the user depresses the icon of "next original document reading start (no sheet insertion)" shown in FIG. 3 without setting a next original document on the scanner unit 24, a message of "Please set a next original document and depress the start button" may be displayed on the liquid crystal display panel 18.

When the user selects an icon of "original document reading end" shown in FIG. 3, the reading job of the original document is ended. In this way, printout is started.

The image data read in the scanner unit 24 through the original document reading and the image data read for printing on the insertion sheet are temporarily stored in the HDD 34. The sheet insertion control unit 36 stores the storage destination of the image data read for the printing on the insertion sheet. The printout by the print unit 22, including the page data for the sheet insertion processing, is performed collectively after all reading jobs are ended. That is, one united print is outputted.

Figure 4:
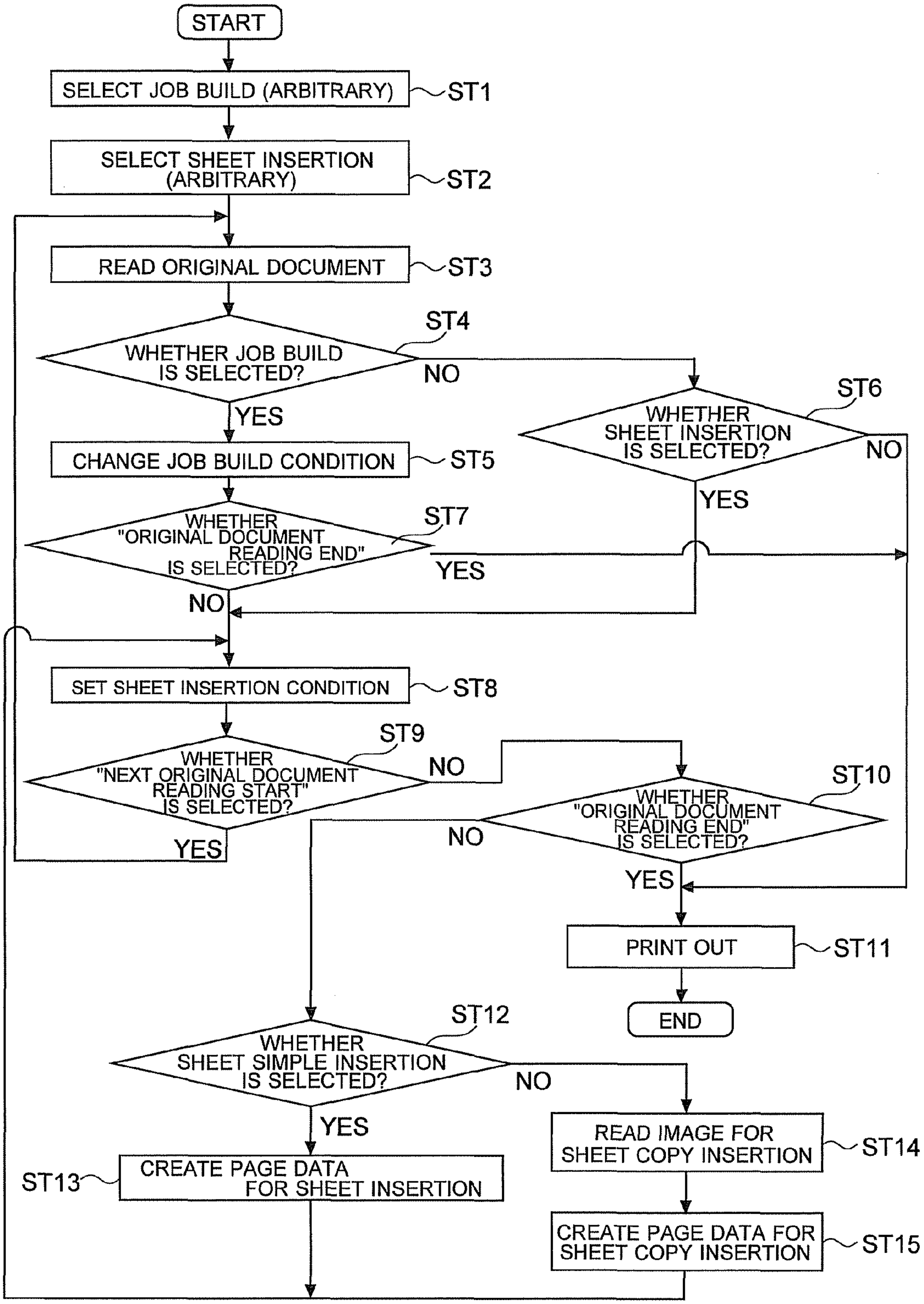
FIG. 4 is a flowchart showing a flow of processing of a copy job using the image forming apparatus.

Next, various printing methods using the image forming apparatus 100 will be described. FIG. 4 is a flowchart showing a flow of processing of a copy job using the image forming apparatus 100.

The user sets an original document to be read first on the scanner unit 24. In the case where the job build processing is performed, the job build button 16*b* in the input button 16 is depressed (ST1). On the other hand, in the case where the job build processing is not performed, the operation of ST1 is skipped. This ST1 is an arbitrary operation.

Subsequently, in the case where the sheet insertion processing is performed, the sheet insertion button 16*c* in the input button 16 is depressed (ST2). On the other hand, in the case where the sheet insertion processing is not performed, the operation of ST2 is skipped. This ST2 is also an arbitrary operation.

Thereafter, the start button 16*a* in the input button 16 is depressed, and reading of the original document set on the scanner unit 24 is performed (ST3). The image data read in this way is temporarily stored in the HDD 34.

Next, it is judged whether or not the job build processing is selected at ST1 (ST4).

In the case where the judgment at ST4 is "YES", the screen of FIG. 2 is displayed on the liquid crystal display panel 18, and the user operates the liquid crystal display panel 18 and can perform the condition change (resetting) of the job build processing (ST5). Incidentally, at ST5, the job build processing can also be cancelled by depressing the stop button.

It is judged at ST7 whether or not the user selects the icon of "original document reading end" shown in FIG. 2 at ST5.

In the case where the judgment at ST7 is "YES", there is no original document to be next read. Thus, the images read till that time are printed out (ST11), and the job is ended.

On the other hand, the case where the judgment at ST7 is "NO" is the case where the start button 16*a* is depressed. In this case, irrespective of whether or not the sheet insertion button 16*c* is depressed at ST2, the screen of FIG. 3 is next displayed on the liquid crystal display panel 18. The user operates the liquid crystal display panel 18 and can set the condition of the sheet insertion processing (ST8).

Here, return is made to the explanation of the judgment at ST4. In the case where the judgment at ST4 is "NO", it is judged whether or not the sheet insertion is selected at ST2 (ST6).

In the case where the judgment at ST6 is "NO", since neither the job build processing nor the sheet insertion processing is selected, a normal copy processing is performed.

Accordingly, the page data of the original document read at ST3 is printed out (ST11), and the job is ended.

In the case where the judgment at ST6 is "YES", the screen of FIG. 3 is displayed on the liquid crystal display panel 18. The user operates the liquid crystal display panel 18 and can set the sheet insertion condition (ST8). In this way, in the case where the job build button 16*b* is depressed at ST1 or the sheet insertion button 16*c* is depressed at ST2, the processing reaches ST8 without fail.

Next, it is judged at ST9 whether or not the user selects "next original document reading start" shown in FIG. 3 at ST8.

In the case where the judgment at ST9 is "YES", return is made to ST3 in order to start reading of a next original document.

The case where the judgment at ST9 is "NO" means that the user selects an icon other than "next original document reading start". Then, it is further judged at ST10 whether or not the icon depressed at ST8 is the icon of "original document reading end".

In the case where the judgment at ST10 is "YES", there is no original document to be read next. Thus, the images read till that time are printed out (ST11), and the job is ended.

In the case where the judgment at ST10 is "NO", it is judged at ST12 which of the sheet simple insertion mode and the sheet copy insertion mode is selected.

In the case where the judgment at ST12 is "YES", page data for sheet simple insertion is created (ST13).

On the other hand, that the judgment at ST12 is "NO" means that the sheet copy insertion mode is selected. Then, the user sets an original document, which has an image to be printed on the insertion sheet, on the scanner unit 24, and reading of the original document is performed (ST14). By this, page data for the sheet copy insertion is created (ST15).

When ST13 and ST15 are ended, return is made to ST8 (sheet insertion condition setting). By this, the sheet insertion can be performed plural times in the same and different sheet insertion modes. Besides, the set sheet insertion processing can also be cancelled. Further, since return is made to ST8, when "next original document reading start" is selected, the processing flow is returned to ST3 through the judgment of "YES" at ST9, and therefore, an original document next to the insertion sheet can be read.

Next, in order to further facilitate the understanding of the processing flow, a description will be further made while using specific examples.

In the case where a simple copy job is performed in which neither job build nor sheet insertion is performed, ST1 and ST2 are skipped and the start button 16*a* is depressed. By this, reading of documents is performed (ST3). Then, the judgment at ST4 becomes "NO" and the processing proceeds to ST6. The judgment at ST6 becomes "NO", and the processing proceeds to ST11. At ST11, the printout of the image data read at ST3 is performed. In this way, the job is ended.

In the case where original documents include plural original document sheets, and copies with picture quality which the user can satisfy are hard to obtain when reading of all the original documents is performed at a time since a difference in density between the original document sheets is large, excellent copies can be created by using the job build function.

For example, in the case where there are original documents including a first original document with a low print density and a second original document with a high print density, the user sets the first original document on the scanner unit 24. Next, the user depresses the job build button 16*b* at ST1. By this, the execution of the job build is selected. The user skips ST2. After the copy density is adjusted according to the first original document, the user depresses the start button 16*a*. By this, reading of the first original document is performed at ST3. The read image data is stored in the HDD 34.

Since the judgment at the next ST4 becomes "YES", the processing proceeds to ST5. At ST5, the job build condition change screen of FIG. 2 is displayed on the liquid crystal display panel 18. The user changes the copy density according to the second original document. After setting the second original document on the scanner unit 24, the user depresses the start button 16*a*. Then, the judgment at ST7 becomes "NO", and advance is made to ST8.

In this way, the sheet insertion condition setting screen of FIG. 3 is displayed on the liquid crystal display panel 18. Here, since the sheet insertion is not performed, the user selects the icon of "next original document reading start". By this, the judgment at ST9 becomes "YES", the processing flow is returned to ST3, and reading of the second original document is performed. Thereafter, since the judgment at ST4 automatically becomes "YES", the screen of FIG. 2 is again displayed on the liquid crystal display panel 18.

Since there is no original document to be read next, the user selects the icon of "original document reading end". By this, the judgment at ST7 becomes "YES", and the processing proceeds to ST11. At ST11, the image data divided into two and read at ST3 are printed out collectively. In this way, the job is ended.

Next, a copy job to perform the sheet insertion processing will be described. Here, an example of a combination with the job build will be described. It is assumed that the flow of the copy job includes (a) copy of a first original document, (b) sheet insertion (sheet copy insertion) in which printing is performed on an insertion sheet, (c) copy of a second original document (different in print density from the first original document), (d) sheet insertion (sheet simple insertion) in which printing is not performed on an insertion sheet, and (e) copy of a third original document (having the same print density as the second document).

The user depresses the job build button 16*b* at ST1 and depresses the sheet insertion button 16*c* at ST2. After setting the first original document on the scanner unit 24, the user depresses the start button 16*a*. By this, reading of the first original document is executed (ST3), and the read image data is temporarily stored in the HDD 34.

The judgment at ST4 becomes "YES" since the job build button 16*b* is depressed at ST1. In this way, the processing proceeds to ST5. Thus, in the case where both the processings of the job build and the sheet insertion are selected, even if the sheet insertion is selected, the judgment at ST6 is not performed. However, as described later, the sheet insertion processing can be performed.

In this example, adjustment is performed at ST5 in order to fit the copy density to the second original document. The setting here is maintained. Since there is an original document to be read next, the user further depresses the start button 16*a* at ST5. By this, the judgment at ST7 becomes "NO" and advance is made to ST8. At ST8, the screen of FIG. 3 for setting the sheet insertion condition is displayed on the liquid crystal display panel 18. The user selects an icon (for example, "sheet copy insertion from first paper feed tray") for performing the sheet copy insertion processing.

Then, the judgment at ST9 becomes "NO", and advance is made to ST10. The judgment at ST10 becomes "NO", and advance is made to ST12. The judgment at ST12 becomes "NO", and advance is made to ST14. At ST14, for example, a message of "Please set a sheet original document and depress the start button" is displayed on the liquid crystal display panel 18. The user sets the original document, which has an image to be printed on the insertion sheet, on the scanner unit 24, and when the start button 16*a* is depressed, reading of the sheet original document is performed, and page data for sheet copy insertion is created (ST15).

When ST15 is ended, return is made to ST8. In order to read the second original document, the user sets the second original document on the scanner unit 24 and selects the icon of "next original document reading start". By this, the judgment at ST9 becomes "YES", return is made to ST3, and the reading of the second original document is performed.

The judgment at ST4 after the reading of the second original document automatically becomes "YES", and advance is made to ST5. Here, since it is not necessary to change the setting of the job build condition, the user depresses the start button 16*a* in order to read the third original document. By this, the judgment at ST7 becomes "NO", and advance is made to ST8. The screen of FIG. 3 for setting the sheet insertion condition is displayed on the liquid crystal display panel 18 at ST8. The user selects an icon (for example, "sheet simple insertion from second paper feed tray") for performing insertion without copy.

Then, the judgment at ST9 becomes "NO", and advance is made to ST10. The judgment at ST10 becomes "NO", and advance is made to ST12. The judgment at ST12 becomes "YES", and advance is made to ST13. By this, at ST13, page data for the sheet simple insertion is created.

When ST13 is ended, return is made to ST8. In order to read the third original document, after setting the third original document on the scanner unit 24, the user selects the icon of "next original document reading start". By this, the judgment at ST9 becomes "YES", return is made to ST3, and reading of the third original document is performed.

The judgment at ST4 after the reading of the third original document automatically becomes "YES", and advance is made to ST5. Since there is no document to be read next, at ST5, the user selects the icon of "original document reading end". By this, the judgment at ST7 becomes "YES", and the processing proceeds to ST11. At ST11, in accordance with the series of processing flow till that time, printout is performed collectively in the sequence of (a) to (e). In this way, the job is ended.

In the series of the processings of (a) to (e) since it is assumed that there is a difference in print density among the first to the third original documents, it is necessary to depress the job build button 16*b* at ST1. As a modified example of this, a brief description will be given to a case where there is no difference in print density among the first to the third original documents and it is unnecessary to change the setting of the job build condition.

In this case, the user depresses only the sheet insertion button 16*c* at ST2 without depressing the job build button 16*b* at ST1. Then, when ST3 is ended, the judgment at next ST4 becomes "NO", and advance is made to ST6. The judgment at ST6 becomes "YES" and advance is made to ST8. In this way, in the case where the job build button 16*b* is depressed, the processing flow passes through ST5 and ST7, however, in the case where the job build button 16*b* is not depressed, the route does not pass through ST5 and ST7 but passes through ST6. There is no change other than that in the processing flow.

As described above, the job build button 16*b* and the sheet insertion button 16*c* are independently provided in the image forming apparatus 100. In the case where both the buttons are depressed, the judgment as to whether or not the sheet insertion button 16*c* is depressed (that is, the judgment at ST6 in FIG. 4) is not substantially performed. However, also in that case, in the case where the user performs a job requiring the two functions of the job build and the sheet insertion, since these can be duplicately selected, the user can operate the image forming apparatus without anxiety.

The printout processing using the job build function and the sheet insertion function can be used also in a case where the printout is performed while the image forming apparatus 100 is used as a printer from the PC 40. For example, the sheet insertion mode is set in a printer browser, or the sheet insertion function is selected in the image forming apparatus 100, and the first print data is transmitted to the image forming apparatus 100. In this case, this print data is not immediately printed on the sheet, but is stored in the HDD 34 of the image forming apparatus 100.

Next, the sheet insertion condition is determined in the image forming apparatus 100, and in the case where printing is performed on the insertion sheet, image data to be printed on this insertion sheet is transmitted from the PC40 to the image forming apparatus 100. Subsequently, next print data is transmitted from the PC40 to the image forming apparatus 100. When the user selects the content that next sheet insertion is not performed, the job is ended here, and the printout processing is performed collectively in the sequence of the first print data, the insertion sheet, and the next print data.

It is also possible to enable all operations in the image forming apparatus 100 to be performed by the printer browser in the PC 40. For example, the sheet insertion function is selected, and the first print data is transmitted from the PC 40 to the image forming apparatus 100. The image forming apparatus 100 transmits the information for setting the sheet insertion condition to the PC 40, and that is displayed on the display of the PC 40. The user can set the sheet insertion condition on the display.

Although the embodiment of the invention has been described, the invention is not limited to the embodiment as stated above, and various variations, modifications, additions, and replacements can be performed by one of ordinary skill in the art within the scope of the invention as recited in the claims, and it should be understood that those are also contained in the scope of the invention.

Figure 5:
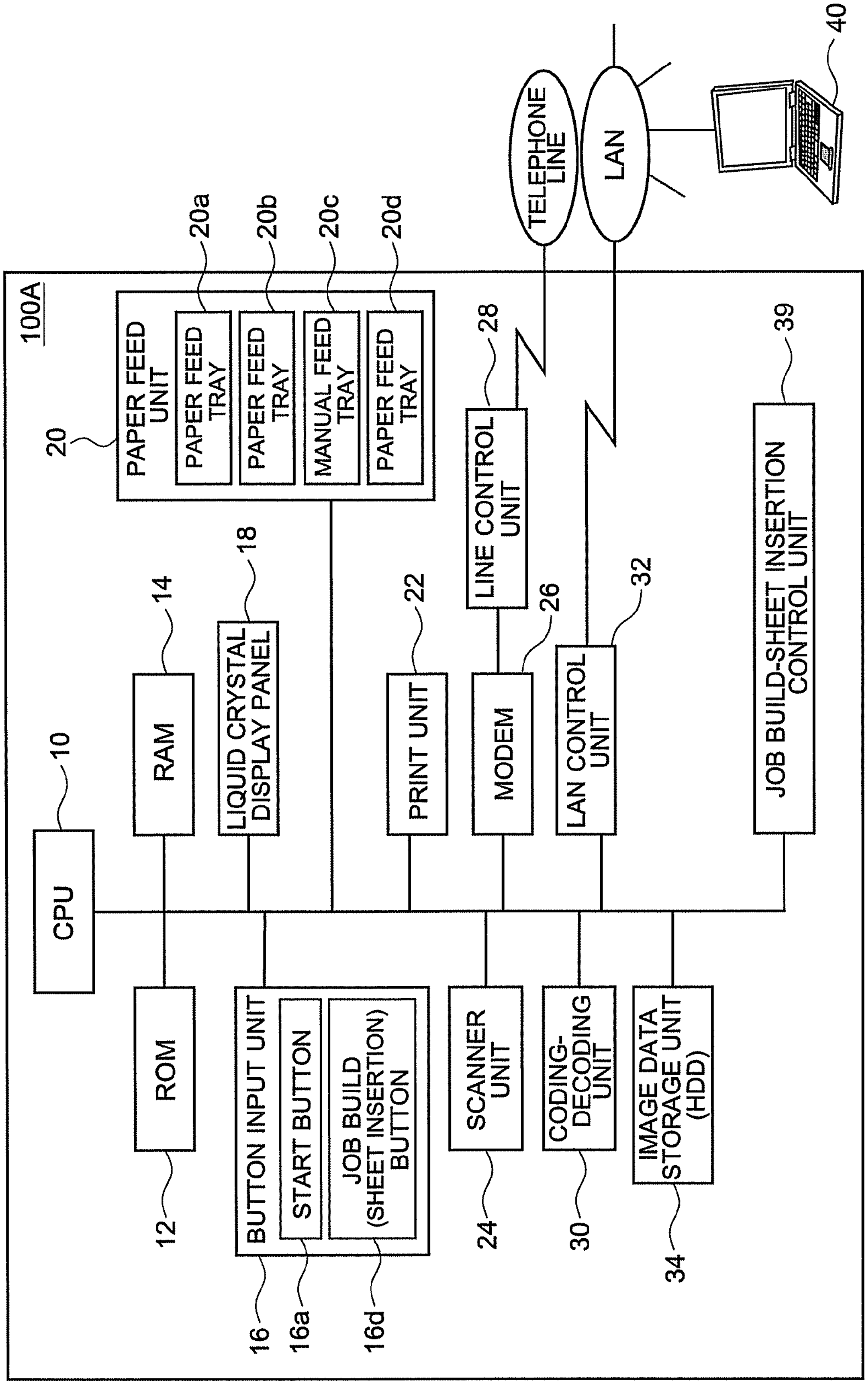
FIG. 5 is a view showing a system structure of an image forming apparatus according to another embodiment of the invention.

For example, FIG. 5 is a system structural view of an image forming apparatus 100A as a modified example of the image forming apparatus 100. As shown in FIG. 5, the image forming apparatus 100A designates a job build processing and a sheet insertion processing by one "job build (sheet insertion) button 16*d*", and the processing is performed by a job build-sheet insertion control unit 39. A processing flow of a case where one of or both of the sheet insertion processing and the job build processing are performed in this image forming apparatus 100A is the same as the processing flow in which a portion relating to the judgment at ST6 is deleted from the processing flow shown in FIG. 4. Besides, a processing flow in the case where neither the sheet insertion processing nor the job build processing is performed in the image forming apparatus 100A becomes a processing flow in which the judgment at ST4 becomes "NO", and advance is made to ST11 without passing through ST6.

What is claimed is:

1. An image forming apparatus comprising:

a scanner unit configured to read an original document;

an image data storage unit configured to store image data read by the scanner unit;

a sheet insertion designation unit configured to designate execution of a sheet insertion processing to insert a specified insertion sheet to the back of a print corresponding to a reading job of an original document before the reading job of the original document;

a sheet insertion control unit configured to request a user to select a mode of the sheet insertion processing, in a case where the execution of the sheet insertion processing is designated, after end of the reading job of the specified original document and to create page data for performing the sheet insertion in the designated mode; and a print unit configured to print out the image data stored in the image data storage unit, together with the page data, collectively after reading jobs of all original documents are ended, modes of the sheet insertion processing include a mode in which printing is performed on the insertion sheet, a mode in which printing is not performed on the insertion sheet, and a mode in which the sheet insertion is skipped, and the sheet insertion control unit connects a processing of one mode selected from these modes with the reading job of the document performed just before.

2. The image forming apparatus according to claim 1, further comprising a display panel to display a setting condition and a progress state of a job and having a touch panel function in which the user sets the condition of the job, wherein the sheet insertion control unit displays the modes of the sheet insertion processing on the display panel and enables the user to select.

3. The image forming apparatus according to claim 2, further comprising plural paper feed trays for arranging plural kinds of insertion sheets separately, wherein the sheet insertion control unit displays plural icons each including a combination of one of the modes of the sheet insertion processing and one of the plural paper feed trays on the display panel.

4. The image forming apparatus according to claim 2, wherein the sheet insertion control unit again displays the modes of the sheet insertion processing which the user can select on the display panel, and enables the sheet insertion processing to be performed continuously after the processing of the one mode selected from the modes is ended.

5. The image forming apparatus according to claim 2, wherein in a case where the mode in which printing is performed on the insertion sheet is selected as the mode of the sheet insertion processing, the sheet insertion control unit reads image data to be printed on the insertion sheet and stores the image data.

6. An image forming apparatus comprising:

a scanner unit configured to read an original document;

an image data storage unit configured to store image data read by the scanner unit;

a job build designation unit configured to designate execution of a job build processing before a reading job of a first original document;

a job build control unit configured to perform control of the job build processing;

a sheet insertion control unit configured, in a case where the execution of the job build processing is designated, to request a user to select a mode of a sheet insertion processing to insert a specified insertion sheet between prints corresponding to reading jobs of plural original documents in a time period separating the reading jobs of the respective documents, and to create page data for performing sheet insertion in the mode designated there; and a print unit configured to print out the image data stored in the image data storage unit, together with the page data created in the sheet insertion processing, collectively after reading jobs of all original documents are ended, modes of the sheet insertion processing include a mode in which printing is performed on the insertion sheet, a mode in which printing is not performed on the insertion sheet, and a mode in which the sheet insertion is skipped, and the sheet insertion control unit connects a processing of one mode selected from these mode with the reading job of the document performed just before.

7. The image forming apparatus according to claim 6, further comprising a display panel to display a setting condition and a progress state of a job and having a touch panel function in which the user sets the condition of the job, wherein the sheet insertion control unit displays the modes of the sheet insertion processing on the display panel and enables the user to select.

8. The image forming apparatus according to claim 7, further comprising plural paper feed trays for arranging plural kinds of insertion sheets separately, wherein the sheet insertion control unit displays plural icons each including a combination of, with respect to the mode in which printing is performed on the insertion sheet and the mode in which printing is not performed on the insertion sheet, these modes and one of the plural paper feed trays on the display panel.

9. The image forming apparatus according to claim 7, wherein the sheet insertion control unit again displays the modes of the sheet insertion processing on the display panel, and enables the user to continuously perform the sheet insertion processing in a desired mode after one of the mode in which printing is performed on the insertion sheet and the mode in which printing is not performed on the insertion sheet is executed.

10. The image forming apparatus according to claim 6, wherein in a case where the mode in which printing is performed on the insertion sheet is selected as the mode of the sheet insertion processing, the sheet insertion control unit reads image data to be printed on the insertion sheet and stores the image data.

11. The image forming apparatus according to claim 7, wherein after a reading job of a specified original document is ended, the job build control unit displays, on the display panel, a screen for designating to change a reading condition of a next original document, to start reading of the next original document, or to end reading of an original document, and in a case where the start of the reading of the next original document is designated on the screen, the sheet insertion control unit continuously displays the modes of the sheet insertion processing on the display panel.

12. An image forming apparatus comprising:

reading means for reading an original document;

image data storage means for storing image data read by the reading means;

job build designation means for designating execution of a job build processing to connect reading jobs of plural original documents into one reading job before a reading job of a first original document;

sheet insertion designation means for designating execution of a sheet insertion processing to insert a specified insertion sheet between prints corresponding to reading jobs of plural original documents before the reading job of the first original document;

job build control means for requesting, in a case where the execution of the job build processing is designated, a user to confirm existence of a next original document as an object of the job build processing after a reading job of a specified original document is ended;

sheet insertion control means for requesting, in a case where the execution of the job build processing or the execution of the sheet insertion processing is designated, the user to select a mode of the sheet insertion processing to insert, after a reading job of a specified original document is ended, a specified insertion sheet after a print corresponding to the reading job of the original document and for creating page data to perform sheet insertion in the mode designated there; and print means for printing out the image data stored in the image data storage means, together with the page data, collectively after reading jobs of all original documents are ended, modes of the sheet insertion processing include a mode in which printing is performed on the insertion sheet, a mode in which printing is not performed on the insertion sheet, and a mode in which the sheet insertion is skipped, and the sheet insertion control means connects a processing of one mode selected from these modes with the reading job of the document performed just before.

13. The image forming apparatus according to claim 12, further comprising display means for displaying a setting condition and a progress state of a job and having a touch panel function in which the user sets the condition of the job, wherein the sheet insertion control means displays the modes of the sheet insertion processing on the display means and enables the user to select.

14. The image forming apparatus according to claim 13, further comprising plural paper feed means for arranging plural kinds of insertion sheets separately, wherein the sheet insertion control means displays plural icons each including a combination of one of the modes of the sheet insertion processing and one of the plural paper feed trays on the display means.

15. The image forming apparatus according to claim 12, wherein in a case where the mode in which printing is performed on the insertion sheet is selected as the mode of the sheet insertion processing, the sheet insertion control means reads image data to be printed on the insertion sheet and stores the image data.

16. The image forming apparatus according to claim 13, wherein the sheet insertion control means again displays the modes of the sheet insertion processing on the display means, and enables the user to continuously perform the sheet insertion processing in a desired mode after one of the mode in which printing is performed on the insertion sheet and the mode in which printing is not performed on the insertion sheet is executed.

17. The image forming apparatus according to claim 13, wherein after a reading job of a specified original document is ended, the job build control means displays, on the display means, a screen for designating to change a reading condition of a next original document, to start reading of the next original document, or to end reading of an original document, and in a case where the start of the reading of the next original document is designated on the screen, the sheet insertion control means continuously displays the modes of the sheet insertion processing on the display means.

* * * * *